United States Patent
Shon et al.

(10) Patent No.: US 8,032,647 B2
(45) Date of Patent: Oct. 4, 2011

(54) DEVICE MANAGEMENT METHOD USING BROADCAST CHANNEL

(75) Inventors: Min-Jung Shon, Seoul (KR); Te-Hyun Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 592 days.

(21) Appl. No.: 11/606,917

(22) Filed: Dec. 1, 2006

(65) Prior Publication Data
US 2007/0143466 A1 Jun. 21, 2007

(30) Foreign Application Priority Data

Dec. 2, 2005 (KR) .......................... 10-2005-0117228
Nov. 28, 2006 (KR) .......................... 10-2006-0118619

(51) Int. Cl.
*G06F 15/16* (2006.01)
*G06F 15/173* (2006.01)

(52) U.S. Cl. ......... 709/230; 709/203; 709/217; 709/227

(58) Field of Classification Search ........... 709/230–237
See application file for complete search history.

(56) References Cited

U.S. PATENT DOCUMENTS

| | | | |
|---|---|---|---|
| 6,111,570 A * | 8/2000 | Sugikawa et al. ............. | 709/205 |
| 6,249,814 B1 | 6/2001 | Shaffer et al. | |
| 2002/0068554 A1 * | 6/2002 | Dusse ............................ | 709/219 |
| 2003/0037128 A1 | 2/2003 | Beadles et al. | |
| 2004/0109454 A1 * | 6/2004 | Sahinoja et al. .............. | 709/223 |
| 2004/0122889 A1 | 6/2004 | Tuijn et al. | |
| 2005/0055453 A1 | 3/2005 | Zhu | |
| 2005/0272455 A1 * | 12/2005 | Oommen ....................... | 455/518 |
| 2006/0039564 A1 * | 2/2006 | Rao ................................ | 455/410 |
| 2006/0218396 A1 * | 9/2006 | Laitinen et al. .............. | 713/167 |
| 2006/0221829 A1 * | 10/2006 | Holmstrom et al. .......... | 370/230 |
| 2007/0049265 A1 * | 3/2007 | Kaimal et al. ................ | 455/423 |
| 2007/0079381 A1 * | 4/2007 | Hartung et al. ................ | 726/26 |

* cited by examiner

*Primary Examiner* — Ian N Moore
*Assistant Examiner* — Jenee Alexander
(74) *Attorney, Agent, or Firm* — Birch, Stewart, Kolasch & Birch, LLP

(57) ABSTRACT

A device management method using a broadcast channel which is capable of simultaneously initializing services provided to a plurality of terminals, varying set values of the plurality of terminals, or upgrading part of software, the method comprising: receiving bootstrap information including data (content) for connecting to a typical device management server; receiving information related to a terminal provisioning server from the typical device management server, and receiving a device management message via a session of the terminal provisioning server, so as to implement a reliable device management method.

18 Claims, 7 Drawing Sheets

DEVICE MANAGEMENT METHOD USING BROADCAST CHANNEL

RELATED APPLICATION

The present disclosure relates to a subject matter contained in priority Korean Applications No. 10-2005-0117228, filed on Dec. 2, 2005, and No. 10-2006-0118619, filed on Nov. 28, 2006, which are herein expressly incorporated by reference in its entirety.

BACKGROUND OF THE INVENTION

1. Field of the Invention

The present invention relates to a device management method, and particularly, to a device management method using a broadcast channel.

2. Background of the Invention

A Device Management (DM) system is based upon bi-directional protocols and one-to-one communication protocols for exchanging DM messages with a DM client (hereinafter, referred to as 'terminal') over a DM session. The DM session should be set in order for a DM server to transfer a DM command to the terminal. The DM server sends a DM session notification message to the terminal in a pushing manner thus to set the DM session. Here, when the terminal having received the message accesses the DM server to request a DM session connection, the DM session is set between the terminal and the DM server.

However, in order to set the DM session, it is not required to always perform the process of sending the DM session notification message to the terminal prior to performing other processes. For example, when the terminal desires to inform the DM Server of a particular event internally generated, the terminal requests the DM session connection from the DM server without receiving the DM session notification message therefrom. The DM server having received the DM session connection request from the terminal then checks authentication information related to the terminal and grants the DM session connection, so as to completely connect the DM session with the terminal.

Upon setting the DM session between the terminal and the DM server, the terminal and the DM server exchange DM messages. Accordingly, the DM server can transfer a DM command to the terminal, whereas the terminal can perform the received DM command to send the result of the performance to the DM server. The DM server may check the result of the DM command performance, thus to terminate the DM session or to send a new DM command to the DM client (i.e., the terminal).

Thus, in the related art, the DM server could perform only through the one-to-one session initiation of a set value of each terminal, variation of the set value thereof or software upgrading thereof, which causes impossibility of a simultaneous management for a plurality of terminals.

Furthermore, the related art could not perform authentication for data required by a plurality of terminals via a broadcast channel when transmitting the corresponding data, resulting in not employing a reliable DM method.

SUMMARY OF THE INVENTION

Therefore, an object of the present invention is to provide a method by which set values required to simultaneously control a plurality of terminals are programmed and part of software of the plurality of terminals can be upgraded.

To achieve these and other advantages and in accordance with the purpose of the present invention, as embodied and broadly described herein, there is provided a Device Management (DM) method for a DM client which supports a broadcasting service comprising: receiving terminal providing server information (which indicates a kind of broadcasting DM server information) which is required to access and authenticate a terminal provisioning server (which indicates such a broadcasting DM server); receiving a DM message by being connected to a session of the terminal provisioning server based upon the terminal provisioning server information; and selectively processing the DM message based upon the terminal provisioning server information to thusly verify reliability of the DM message.

According to another embodiment of the present invention, a Device Management (DM) method in a DM client which supports a broadcasting service comprising: receiving a particular message including data necessary to be connected to a terminal provisioning server; receiving a DM message by being connected to the terminal provisioning server according to the particular message; selectively processing the DM messages according to the service guide to verify reliability.

According to another embodiment of the present invention, A method for managing a device in a mobile communications system, the method comprises: receiving first information from a first server for connecting to a second server;

connecting to the second server using the received first information;

receiving second information from the second server for connecting to a third server capable of transmitting information on a broadcast channel;

connecting to the third server using the received second information; and receiving third information from the third server on the broadcast channel.

To achieve these and other advantages and in accordance with the purpose of the present invention, a Device Management (DM) client may comprise: a file deliver client (e.g., a kind of reception module) for receiving a DM message from a first server and receiving from a second server information required for selectively processing the DM message by being connected to a session of the first server; and a checking module for checking whether a group ID included in the DM message is the same as a group included in the information; and a processor for receiving the DM message to perform a DM command included in the DM message when the two group IDs are the same.

To achieve these and other advantages and in accordance with the purpose of the present invention, a mobile terminal for receiving device management information, the mobile terminal may comprise: a receiver adapted to receive first information from a first server for connecting to a second server, wherein the receiver adapted to receive second information from the second server for connecting to a third server capable of transmitting information on a broadcast channel and the receiver adapted to receive third information from the third server on the broadcast channel.

To achieve these and other advantages and in accordance with the purpose of the present invention, a Device Management (DM) system may comprise: a DM client for supporting a broadcasting service; a first server for transmitting a DM message to the DM client; and a second server for transmitting information required to selectively process the DM message to the DM client by being connected to a session of the first server.

Here, the first server may be implemented as a terminal provisioning server, and the second server may be implemented as a typical DM server or broadcasting server.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail of the present invention, with reference to the accompanying drawings.

A DM system according to the present invention may comprise a plurality of terminals for supporting a broadcasting service, a first server for managing the terminals so as to allow the plurality of terminals to be provided with the broadcasting service, and a second server for providing the plurality of terminals with information required for an access to the first server and authentication thereof.

In one embodiment, the second server may be implemented as a broadcasting server. In this case, the second server can transmit to a terminal data including information (or contents) for the connection to the first server. Here, the data may be provided by a broadcasting server or a typical DM server.

In another embodiment, the second server may be implemented as the typical DM server. In this case, the second server can broadcast terminal provisioning server information to the terminal or transmit it to the terminal in an one-to-one manner, the terminal provisioning server information including information required for the access to the first server and authentication thereof.

That is, the second server may separately transmit the terminal provisioning server information containing information required for the access to the first server and the authentication thereof, or substitute previously-used data by a new DM message which further includes data for the connection with the first server for transmission.

Further, the present invention can allows the terminal provisioning server to selectively manage terminals in a particular group by including a group ID in data or terminal provisioning server information, the group ID corresponding to a terminal to receive data or terminal provisioning server information.

Hereinafter, preferred embodiments of the present invention will be explained with reference to the accompanying drawings.

Figure 1:
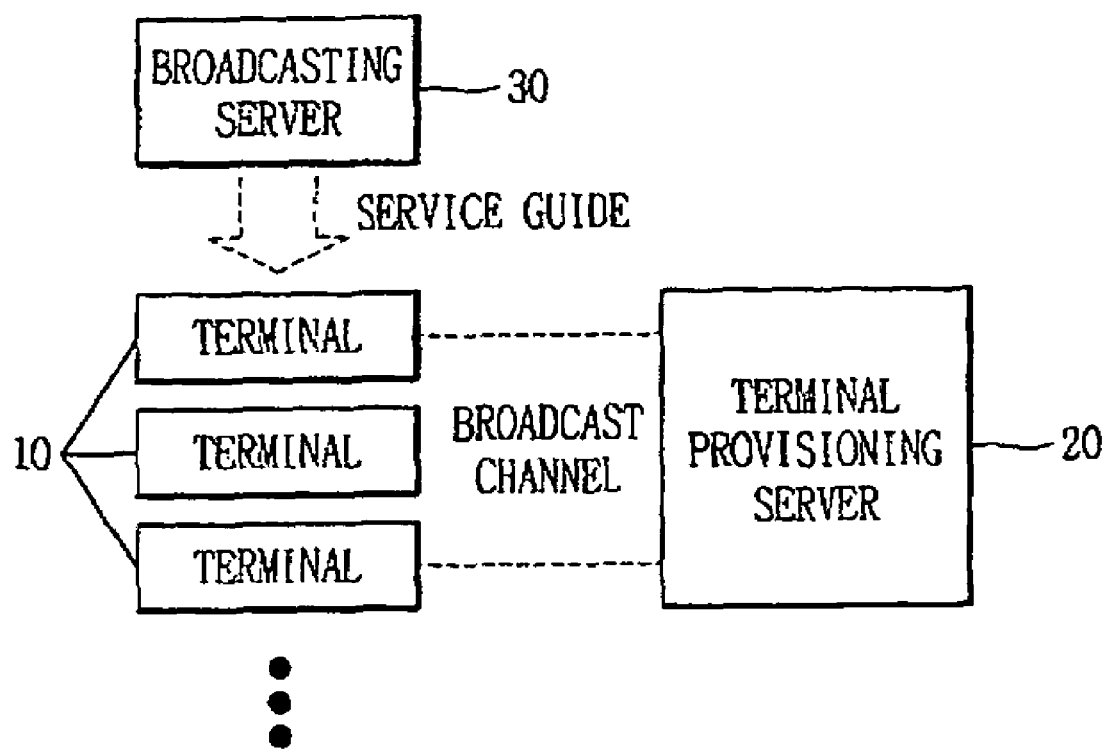
FIG. 1 is a view illustrating a construction of a device management system in accordance with a first embodiment of the present invention.

FIG. 1 is a view illustrating a construction of a device management system in accordance with a first embodiment of the present invention. As illustrated in FIG. 1, a device management system according to the present invention comprises a plurality of terminals 10 for supporting a broadcasting service, a terminal provisioning server 20 for managing the plurality of terminals 10 by broadcasting a DM message to the plurality of terminals 10, and a broadcasting server 30 for providing a service guide which includes data required for the connection and authentication of the terminal provisioning server 20.

The broadcasting server 30 transmits to the terminal 10 a service guide which further includes data containing information related to a method by which the terminal 10 securely receives a broadcasting session that the terminal provisioning server 20 transmits and information related to a method by which the terminal 10 authenticates and relies on the terminal provisioning server 20.

The terminal 10 may inactively receive a service guide using a broadcast channel, or actively receive the service guide according to a subscriber's request using an interaction channel. The method using the broadcast channel assumes that the terminal 10 already knows a broadcast channel for broadcasting the service guide and is able to be previously connected to the corresponding broadcast channel, while the method using the interaction channel assumes that the terminal 10 already knows an URL address or the like of the service guide. The terminal 10 can know the URL address of the service guide by inputting in the terminal 10 an address which is additionally provided at a time when the user initially subscribes for a service, through web-sites, or according to programming by a manufacturer.

In order to implement the device management system and method according to the present invention, the service guide further includes data for the connection to the terminal provisioning server 20. In general, a service guide denotes a digital content which is formed based upon a markup language such as XML (extensive Markup Language). The terminal 10 can automatically parse or interpret the service guide.

In order to embody the device management system and method according to the present invention, such data as follows are used for the connection to the terminal provisioning server 20. The data can be transferred via a service guide.

1) Session Description Information

The session description information denotes information related to a broadcasting session for broadcasting DM messages by the terminal provisioning server 20. The session description information includes session address and port information (e.g., IP address, URL, TCP/UDP port address, etc.), transmission protocols (e.g., RTP, FLUTE, etc.), codec, transfer rate, and the like.

2) Connectivity Information

The connectivity information denotes several information, such as gateway information, proxy information, and the like, which are required to access the terminal provisioning server 20.

3) Certificate

The certificate denotes information for recognizing whether a DM message broadcast by the terminal provisioning server 20 is reliable. Since the terminal provisioning server 20 also broadcasts an electronic signature for a DM message at the same time of broadcasting the DM message, the terminal 10 can decrypts the electronic signature by extracting a public key of the terminal provisioning server 20 from the certificate.

4) OCSP (Online Certificate Status Protocol) Response

The OCSP response is used to ensure reliability of the certificate of the terminal provisioning server 20, the certificate obtained from terminal provisioning server information. Since the certificate of the terminal provisioning server 20 is issued by a particular certificate authority, a checking procedure as to whether the certificate is valid is performed between the certificate authority and the terminal provisioning server 20. Also, the certificate authority transmits the OCSP response to the terminal provisioning server 20 such that the terminal provisioning server 20 can ascertain that the certificate is valid.

5) Target Group ID

The target group ID denotes information used such that the terminal 10 can selectively receive a message corresponding to the terminal 10 itself among plural DM messages broadcast by the terminal provisioning server 20. When broadcasting DM messages, the terminal provisioning server 20 includes the target group ID in the message and accordingly can transmit a DM message which targets only the terminals belonging to a specific group. Therefore, when receiving the DM message through a broadcasting session, the terminal 10 checks a target group ID included in the message. The terminal then processes the corresponding DM message only when the checked target group ID is the same as a target group ID obtained in terminal provisioning server information. For example, the target group ID can be distinguished according to an area (e.g., a country) to which the corresponding terminal belongs or a service method of the corresponding terminal (e.g., a terminal adapting DVB-H method, a terminal adapting MBMS method, etc.).

Figure 2:
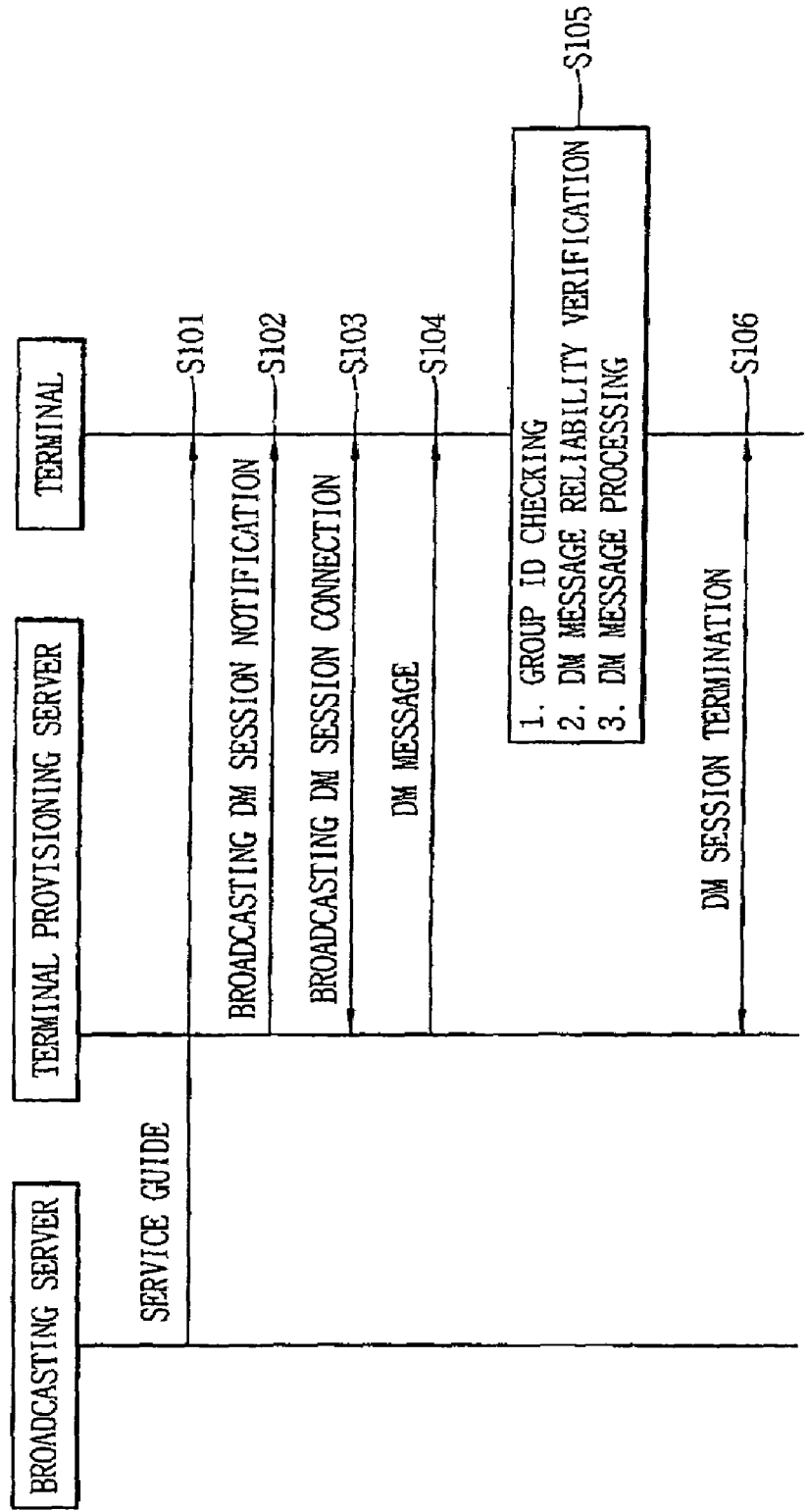
FIG. 2 is a flowchart illustrating a device management method in accordance with a first embodiment of the present invention.

FIG. 2 is a flowchart illustrating a device management method in accordance with a first embodiment of the present invention. Explanation will be made of a method by which a terminal securely receives and authenticates a DM message that a terminal provisioning server broadcasts by using a service guide provided by a broadcasting server, with reference to FIG. 2.

The terminal is connected to a broadcasting server by means of a browser to receive a service guide as information related to a broadcasting service provided by a broadcasting company (S101). The service guide may further include data which contains session description information, connectivity information, certificate, OCSP response and a target group ID.

Afterwards, the terminal provisioning server notifies the terminal of a broadcasting DM session for request (S102). The terminal is connected to the session of the terminal provisioning server by using the session description information and the connectivity information included in the service guide (S103). Here, the session description information includes session address and port information (e.g., IP address, URL, TCP/UDP port address, etc.), transmission protocols (e.g., RTP, FLUTE, etc.), codec and transfer rate. The connectivity information includes gateway information and proxy information.

Upon connecting the broadcasting DM session between the terminal and the terminal provisioning server, the terminal provisioning server broadcasts a DM message to the terminal (S104). The terminal provisioning server includes a target group ID in the DM message, and accordingly allows only a terminal having the group ID included in the message to receive the corresponding message. Also, the terminal provisioning server transmits the DM message together with an electronic signature for the DM message. The electronic signature is generated by a typical electronic signature generation method. That is, the terminal provisioning server generates a digest value from the DM message according to a hash algorithm, and encrypts the digest value using a private key of the terminal provisioning server, so as to generate an electronic signature.

When receiving the DM message from the terminal provisioning server, the terminal performs processes as follows (S105).

First, the terminal ascertains a target group ID in the DM message received from the terminal provisioning server. Here, if the target group ID in the DM message is the same as that of the terminal, the terminal processes the DM message. If not, the terminal ignores the message. The terminal can recognize its target group ID by service guide or terminal provisioning server information downloaded from the broadcasting server.

If the target group ID Of the terminal is the same as that in the DM message, the terminal verifies reliability of the DM message. The reliability is verified by the certificate and OCSP response included in the service guide downloaded from the broadcasting server. That is, the terminal extracts a public key of the terminal provisioning server from the certificate and decrypts the electronic signature be means of the extracted public key to thusly obtain a digest value. The terminal then obtains another digest value from the DM message using the same hash algorithm as that used by the terminal provisioning server. If the two digest values are the same, the terminal relies on the terminal provisioning server and the DM message. Also, the reliability of the certificate can be ensured by the OCSP response.

Once verifying the reliability of the DM message, the terminal processes the DM message. The terminal initializes or changes its set value according to a DM command included in the DM message. Alternatively, the terminal may install or upgrade its software according to the DM command included in the DM message. When completely processing the DM message, the terminal terminates the broadcasting DM session with the terminal provisioning server (S106).

Although not shown in FIG. 2, it may also be implemented such that the terminal can compare version information related to a software provided from the terminal provisioning server with version information related to its software having installed therein, and feedback the result of the comparison to the terminal provisioning server.

Figure 3:
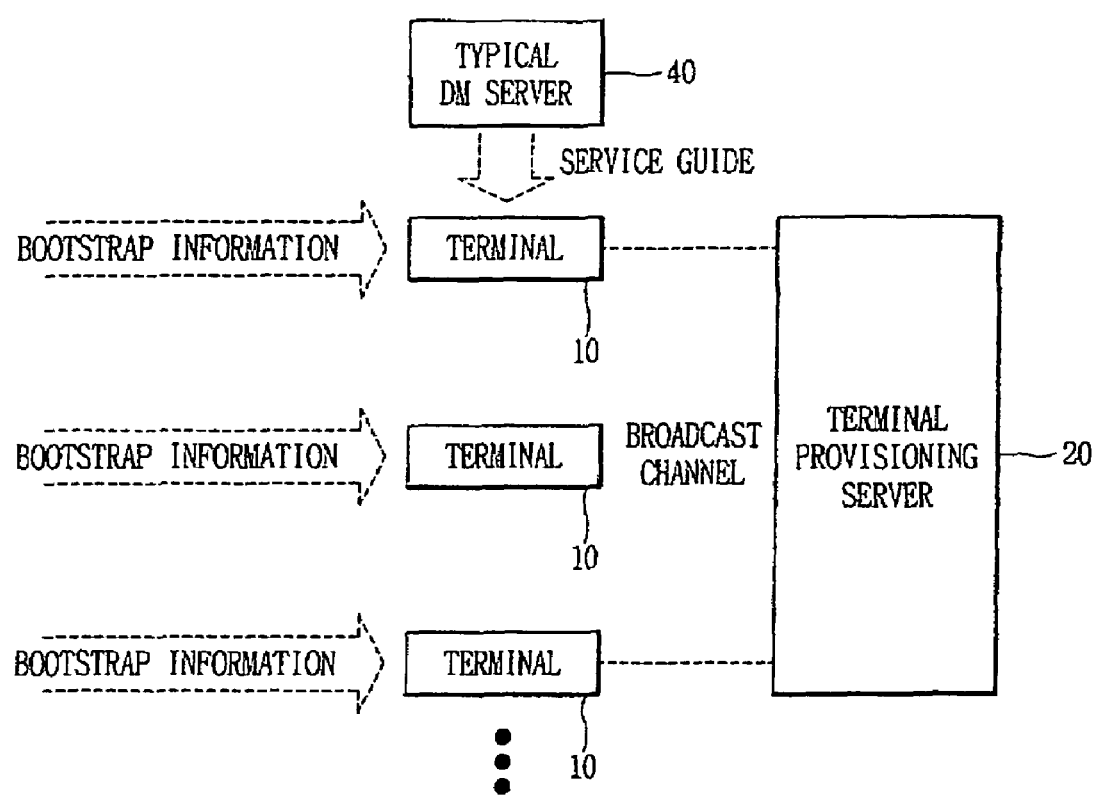
FIG. 3 is a view illustrating a construction of a device management system in accordance with a second embodiment of the present invention.

FIG. 3 is a view illustrating a construction of a device management system in accordance with a second embodiment of the present invention. As illustrated in FIG. 2, a device management system according to the present invention comprises a plurality of terminals 10 for supporting a broadcasting service, a terminal provisioning server 20 for managing the plurality of terminals 10 by broadcasting a DM command to the plurality of terminals 10, and a typical DM server 40 for providing a service guide which is required for the connection between the plurality of terminals 10 and the terminal provisioning server 20 and authentication of the terminal provisioning server 20.

The terminal 10 can be connected to the terminal provisioning server 40 using bootstrap information which includes address value and authentication value of the typical DM server 40. The bootstrap information may remotely be transmitted to the terminal via the bootstrap server (not shown), preprogrammed in the terminal by a terminal manufacturer, or be programmed later in the terminal by a user.

The typical DM server 40 transmits to the terminal 10 a service guide which further includes data related to a method by which the terminal 10 securely receives a broadcasting session transmitted from the terminal provisioning server 20 and data related to a method by which the terminal 10 relies on the terminal provisioning server 20.

In order to implement the device management system and method according to the present invention, the service guide may further include data which contains session description information, connectivity information, certificate, OCSP response and a target group ID. Detailed explanation of the data for the connection to the terminal provisioning server which is further included in the service guide has been disclosed in the first embodiment, and thus it will be omitted.

The terminal 10 is connected to the terminal provisioning server 20 based upon the service guide received from the typical DM server 40. Thus, the terminal 10 can selectively handle a DM message received from the terminal provisioning server 20 and process the received DM message after verifying its reliability.

Figure 4:
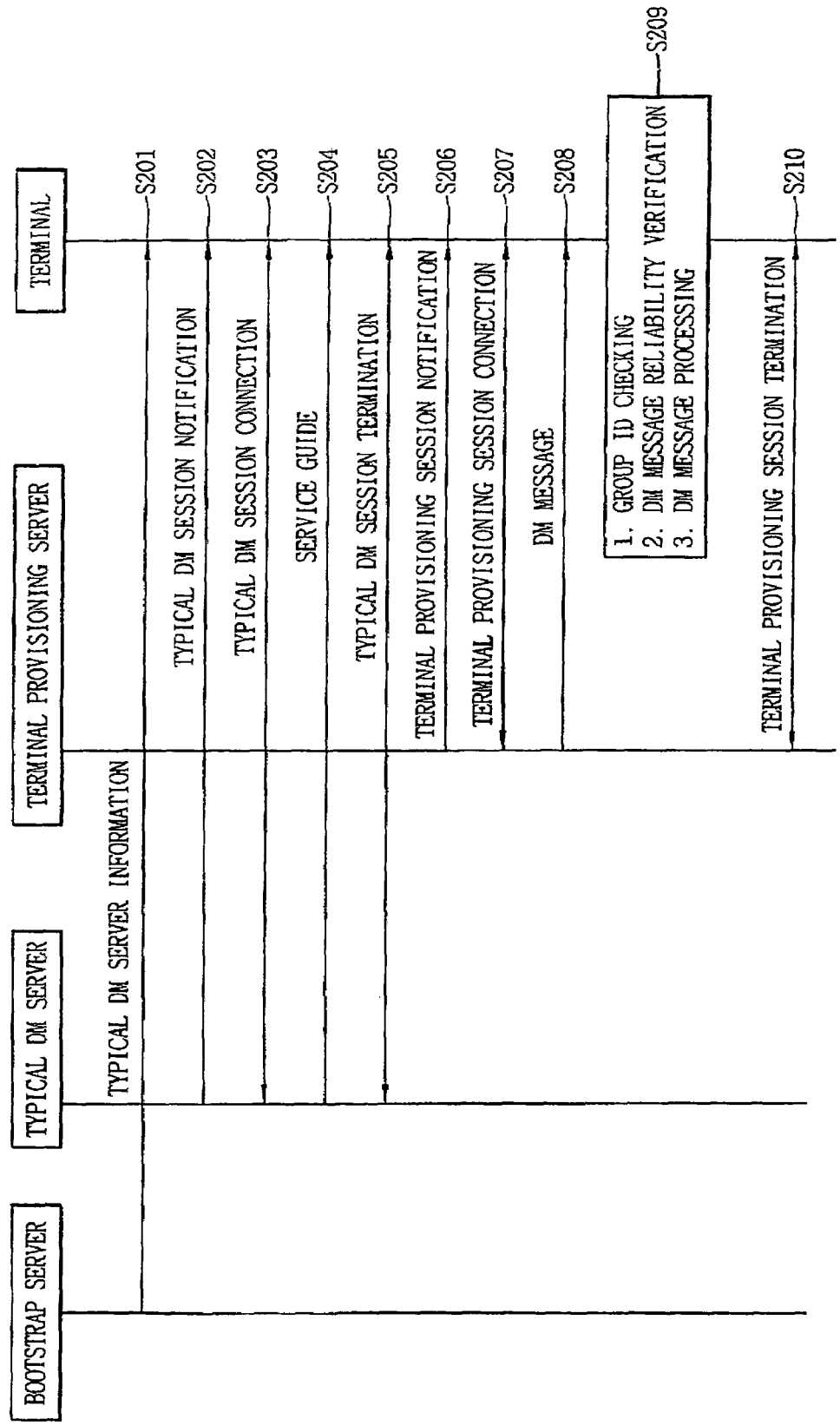
FIG. 4 is a flowchart illustrating a device management method in accordance with a second embodiment of the present invention.

FIG. 4 is a flowchart illustrating a device management method in accordance with a second embodiment of the present invention. Referring to FIG. 4, explanation will be given of a method by which a terminal securely receives and authenticates a broadcasting session transmitted by a terminal provisioning server by use of a service guide provided by a typical DM server.

The terminal receives typical DM information (i.e., bootstrap information) from a bootstrap server (S201). The typical DM information includes address value and authentication value of a typical DM server which provides a service guide to the terminal.

Afterwards, when the typical DM sever notifies a session setup (S202), the terminal ascertains the address value and authentication value provided from the bootstrap server to be connected to the session of the typical DM server (S203). The terminal then receives a service guide further including data for the connection to the terminal provisioning server from the typical DM server via the session, the data containing session description information, connectivity information, certificate, OCSP (Online Certificate Status Protocol) response and a target group ID (S204).

The terminal having received the service guide from the typical DM server terminates the session with the typical DM server (S205). When the terminal provisioning server notifies a broadcasting DM session (S206), the terminal is connected to the broadcasting DM session by use of session description information and connectivity information included in the service guide (S207).

Procedures after the session connected between the terminal provisioning server and the terminal are the same as those in the first embodiment, explanation of which will thusly not be repeated. That is, the second embodiment of the present invention is different from the first embodiment in the point that the terminal receives from the typical DM server the service guide including data for the connection to the terminal provisioning server and receives information for the connection to the typical DM server from the bootstrap server.

In the flowcharts of the first and second embodiments, only one terminal has been adapted to explain the device management system according to the present invention. However, the terminal provisioning server establishes a broadcasting DM session with a plurality of terminals which have downloaded the service guide to thusly broadcast a DM message to the plurality of terminal at once.

Figure 5:
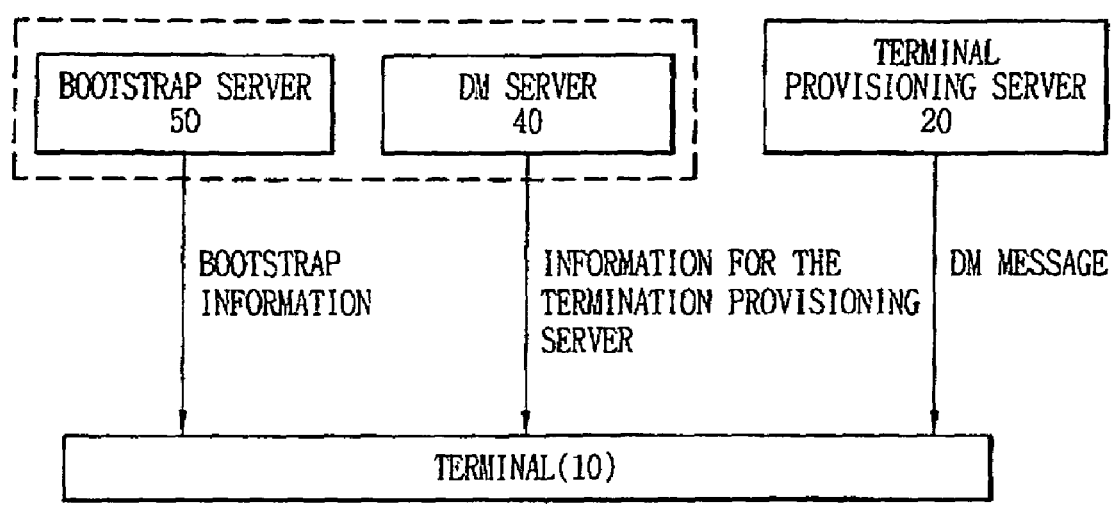
FIG. 5 is a view illustrating a construction of a device management system in accordance with a third embodiment of the present invention.

FIG. 5 illustrates a construction of a device management system in accordance with a third embodiment of the present invention. As illustrated in FIG. 5, a Device Management (DM) system according to the present invention comprises a plurality of terminals 10 which support a broadcasting service, a terminal provisioning server 20 for broadcasting a DM command to the plurality of terminals 10 to thusly manage the plurality of terminals 10, a typical DM server 40 for providing terminal provisioning server information which the plurality of terminals 10 require to access and authenticate the terminal provisioning server 20, and a bootstrap server 50 for delivering bootstrap information. Here, the bootstrap server 50 may be configured separately from the typical DM server 40. Otherwise, the bootstrap server and the typical DM server may be configured both included in a main server. Thus, the bootstrap server to be explained hereafter can be substituted by the typical DM server.

The terminal 10 can be connected to the typical DM server 40 using the bootstrap information which includes address value and authentication value of the typical DM server 40. The bootstrap information may remotely be transmitted to the terminal via the bootstrap server 50, preprogrammed in the terminal by a terminal manufacturer, or be programmed later in the terminal by a user.

The typical DM server 40 transmits to the terminal 10 terminal provisioning server information which includes information regarding a method for securely receiving by the terminal 10 a broadcasting session transmitted by the terminal provisioning server 20 and a method for reliably authenticating the terminal provisioning server 20.

In order to embody the DM system and method according to the present invention, terminal provisioning server information includes session description information, connectivity information, certificate, OCSP (Online Certificate Status Protocol) response and a target group ID, all of which are the same as those described in the first embodiment, so as to omit the detailed explanation thereof.

The terminal 10 can be connected to the terminal provisioning server 20 using the terminal provisioning server information received from the typical DM Server 40. The terminal 10 can also selectively process the DM message received from the terminal provisioning server 20, to thus verify reliability of the received DM message. The connection to the terminal provisioning server 20 is achieved based upon the session description information and connectivity information. The received DM message are received based upon the target group ID, and the reliability verification is performed based upon the certificate and OCSP response.

Figure 6:
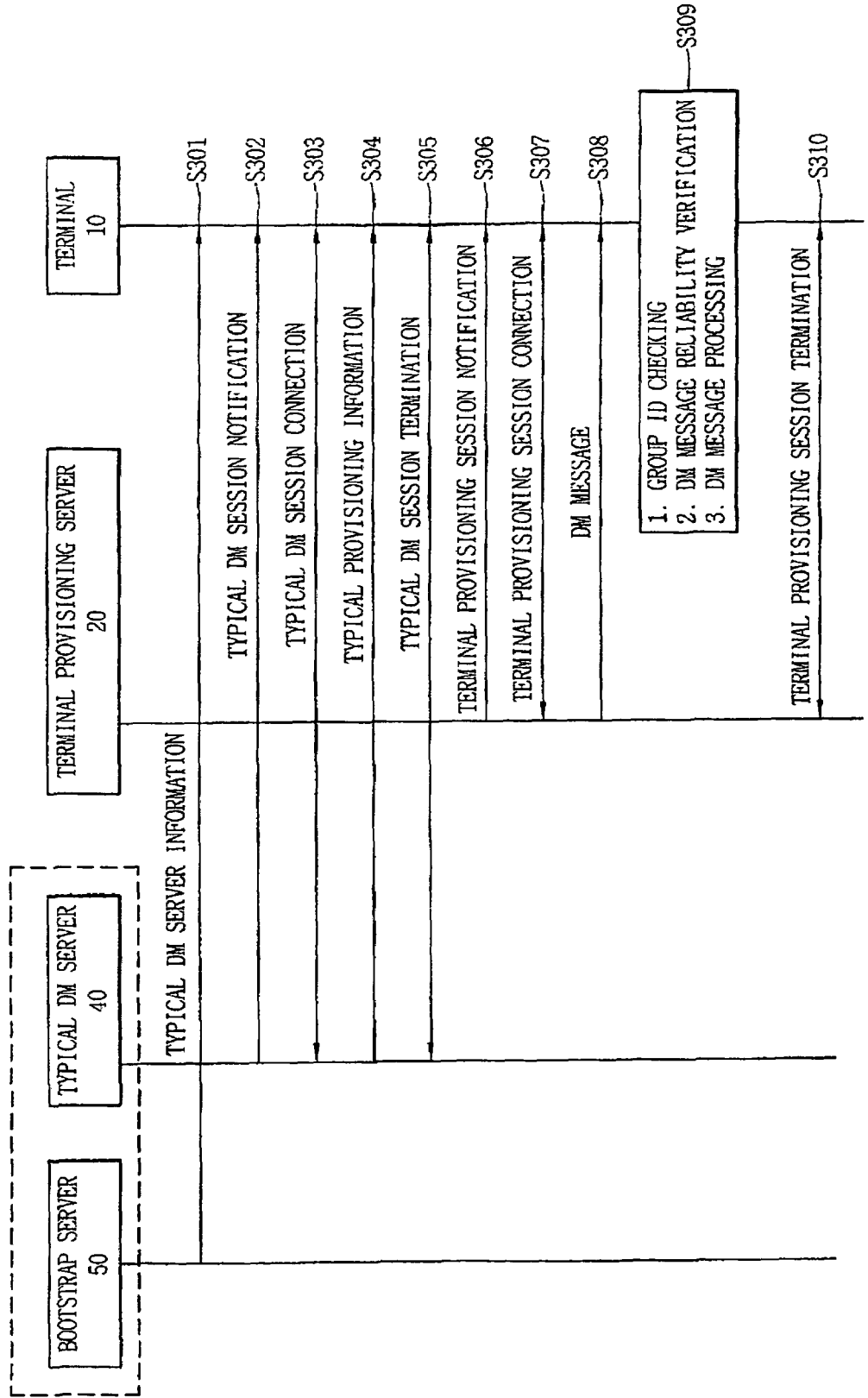
FIG. 6 is a flowchart illustrating a device management method in accordance with a third embodiment of the present invention.

FIG. 6 is a flowchart illustrating a device management method in accordance with a third embodiment of the present invention. Here, a terminal can use terminal provisioning server information provided from a typical DM server to enable a safe reception and authentication for a broadcasting session transmitted by a terminal provisioning server.

The terminal receives typical DM server information (i.e., bootstrap information) from a bootstrap server (S301). The typical DM server information may include an address value and an authentication value for the typical DM Server which is to provide the terminal with terminal provisioning server information.

Afterwards, when receiving a notification of a typical DM session from the typical DM server (S302), the terminal ascertains the address value and authentication value provided from the bootstrap server and is connected to a typical DM server session (S303). The terminal also receive the terminal provisioning server information from the typical DM server via the session, the terminal provisioning server information including session description information, connectivity information, certificate, OCSP response and target group ID (S304).

The terminal having received the terminal provisioning server information from the terminal provisioning server terminates a session with the typical DM server (S305). When receiving a broadcasting DM session notification from the terminal provisioning server (S306), the terminal is connected to a session of the terminal provisioning server by using the session description information and connectivity information included in the terminal provisioning server information (S307). Here, the session description information includes session address and port information (e.g., IP address, URL, TCP/UDP port address, etc.), transmission protocols (e.g., RTP, FLUTE, etc.), codec and transfer rate, and the connectivity information includes gateway information and proxy information.

Upon connecting the broadcasting DM session between the terminal and the terminal provisioning server, the terminal provisioning server broadcasts a DM message to the terminal (S308). The terminal provisioning server includes a target group ID in the DM message, and accordingly allows only a terminal having the group ID included in the message to receive the corresponding message. Also, the terminal provisioning server transmits the DM message together with an electronic signature for the DM message. The electronic signature is generated by a typical electronic signature generation method. That is, the terminal provisioning server generates a digest value from the DM message according to a hash algorithm, and encrypts the digest value using a private key of the terminal provisioning server, so as to generate an electronic signature.

When receiving the DM message from the terminal provisioning server, the terminal performs processes as follows (S309).

First, the terminal ascertains a target group ID in the DM message received from the terminal provisioning server. Here, if the target group ID in the DM message is the same as that of the terminal, the terminal processes the DM message. If not, the terminal ignores the message. The terminal can recognize its target group ID by terminal provisioning server information downloaded from the typical DM server.

If the target group ID Of the terminal is the same as that in the DM message, the terminal verifies reliability of the DM message. The reliability is verified by the certificate and OCSP response included in the terminal provisioning server information downloaded from the terminal provisioning server. That is, the terminal extracts a public key of the terminal provisioning server from the certificate and decrypts the electronic signature be means of the extracted public key to thusly obtain a digest value. The terminal then obtains another digest value from the DM message using the same hash algorithm as that used by the terminal provisioning server. If the two digest values are the same, the terminal relies on the terminal provisioning server and the DM message. Also, the reliability of the certificate can be ensured by the OCSP response.

Once verifying the reliability of the DM message, the terminal processes the DM message. The terminal initializes or changes its set value according to a DM command included in the DM message. Alternatively, the terminal may install or upgrade its software according to the DM command included in the DM message. When completely processing the DM message, the terminal terminates the broadcasting DM session with the terminal provisioning server (S310).

Although not shown in FIG. 2, it may also be implemented such that the terminal can compare version information related to a software provided from the terminal provisioning server with version information related to its software having installed therein, and feedback the result of the comparison to the terminal provisioning server.

Concerning the flowchart in the embodiment, the DM method according to the present invention which can be implemented only by one terminal has been explained. However, the terminal provisioning server connects the broadcasting DM session with a plurality of terminals which have downloaded the terminal provisioning server information, thus to enable a broadcasting of the DM message to the plurality of terminals at once.

Figure 7:
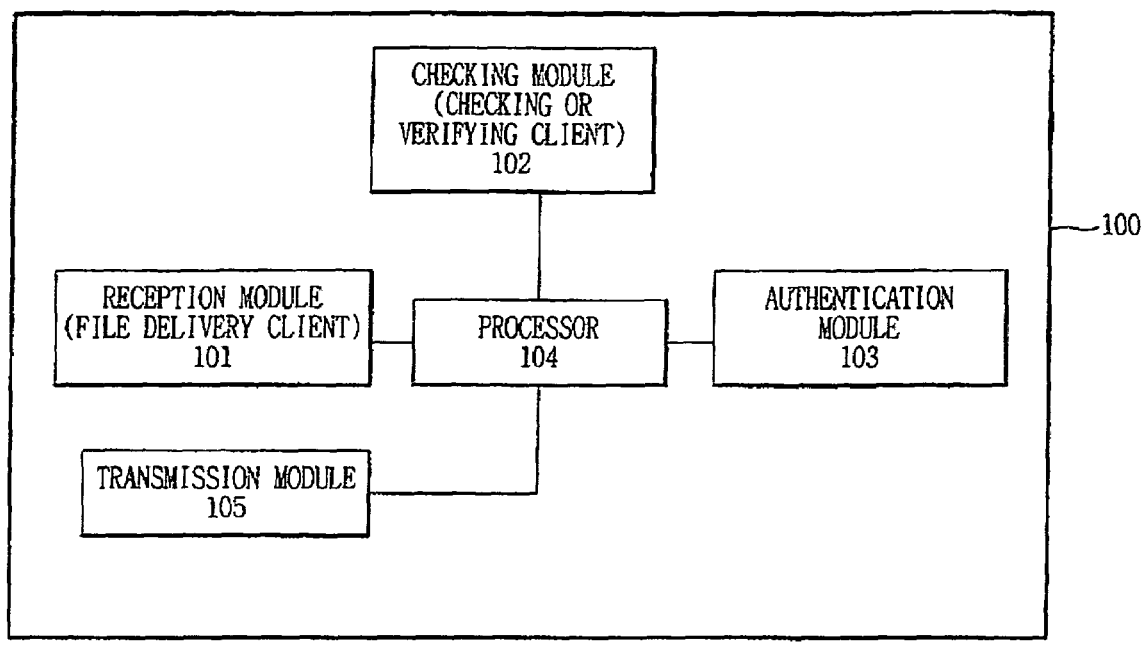
FIG. 7 is a view illustrating a construction of a device management client in accordance with the present invention.

FIG. 7 illustrates a device management client 100 according to the present invention. As illustrated in FIG. 7, the DM client 100 comprises a reception module (or receiver) 101, a checking module 102, an authentication module 103, a processor 104 and a transmission module 105.

The reception module 101 receives terminal provisioning server information transmitted by a broadcasting server or typical DM server, and receives a DM message transmitted by a terminal provisioning server. Here, the terminal provisioning server information may include session description information, connectivity information, certificate, OCSP response and target group ID. Detailed explanation with respect to each item included in the terminal provisioning server information has been provided above in detail so as not to be repeated.

The reception module 101 first receives bootstrap information or terminal provisioning server information. The reception module 101 can be connected to a session of the terminal provisioning server using the session description information and connectivity information included in the terminal provisioning server information. The reception module 101 then receives the DM message via the connected session with the terminal provisioning server.

The checking module 102 checks whether a group ID of the terminal (i.e., the target group ID of the DM client) included in the terminal provisioning server information is the same as the group ID included in the DM message. This process may not be performed if the group ID is not included in the terminal provisioning server information.

The processor 104 controls the reception module 101, the checking module 102 and the authentication module 103. If it is determined by the checking module 102 that the group ID included in the DM message is the same as the group ID included in the terminal provisioning server information, the processor 104 delivers the DM message to the authentication module 103. If not, the processor 104 does not process the DM message.

The authentication module 103 can verify reliability of the DM message using the certificate and OCSP response provided by being included in the terminal provisioning server information. The DM message is received together with an electronic signature. Accordingly, the authentication module 103 extracts a public key of the terminal provisioning server from the certificate and decrypts the electronic signature by means of the extracted public key, thus to obtain a digest value. Then, another digest value is obtained from the DM message by using the same hash algorithm as that used by the terminal provisioning server. If both the digest values are the same, the terminal provisioning server and the DM message are reliable.

The processor 104 processes only the DM message with reliability verified by the authentication module 103. That is, the processor 104 performs a DM command included in the DM message. For example, the processor can upgrade software of the DM client or change a set value according to the DM command.

The transmission module 105 includes the most basic function of communications terminals. The transmission module 105 denotes a module for transmitting information toward a server when setting the session between the server and the terminal as shown in the flowchart of FIG. 2. Transmission of information from the server to the terminal upon setting the session is obvious to those skilled in the art, explanation of which will thusly be omitted.

As described above, the present invention can effectively adapt a reliable DM method capable of simultaneously initializing a plurality of terminals, changing set values of the plurality of terminals, or upgrading part of software of the plurality of terminals by allowing transmission of set values needed to the plurality of terminals via a broadcast channel and allowing authentication for message received.

Particularly, by employing a list of target group IDs, one terminal provisioning server can effectively be operated to transmit different DM commands according to terminals each of which adapts different operating methods or is used in different countries, or other conditions.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. An Open Mobile Alliance (OMA) device management method performed by a mobile terminal cooperating with plural servers including a broadcast server for broadcasting a service guide and a provisioning server for broadcasting a device management (DM) message, the method comprising:
  receiving the service guide that is broadcast from the broadcast server, the service guide including data required for connection and authentication with respect to the provisioning server that is broadcasting messages for device management (DM), the service guide including information related to a broadcasting service, session description information, connectivity information, and a target group ID (identity), the target group ID being identified according to an area to which a device management client belongs or a service method adopted by the device management client;
  establishing a DM session with the provisioning server using the received service guide;
  receiving a DM message that is broadcast from the provisioning server via a broadcast channel,
  wherein the DM message includes a group ID for a plurality of terminals belonging to a specific group, the group ID used for controlling the plurality of terminals via the DM message that was broadcast from the provisioning server; and
  performing a DM message reliability verification procedure including comparing the target group ID included in the service guide received from the broadcast server with the group ID included in the DM message received from the provisioning server, such that the mobile terminal selectively processes the DM message intended for said mobile terminal among a plurality of DM messages broadcast from the provisioning server,
  wherein the service guide further includes at least one of certificate information and an OCSP (Online Certificate Status Protocol) response,
  wherein the DM message is received together with an electronic signature, and
  wherein the DM message reliability verification procedure further includes comparing a digest value obtained from decrypting an electronic signature which is extracted from the certificate information included in the service guide with a digest value obtained from decrypting the electronic signature received together with the DM message if the target group ID included in the service guide is matched with the group ID included in the received DM message.

2. The method of claim 1, wherein the service guide is selectively received via at least one of the broadcast channel used when the service guide is broadcast to multiple subscribers and an interaction channel used in response to a subscriber request for the service guide.

3. The method of claim 1, wherein the service guide contains digital content having an extended markup language (XML) format that can be automatically parsed or interpreted by the mobile terminal.

4. The method of claim 3, wherein the service guide is received by a browser function implemented in the mobile terminal.

5. The method of claim 1, wherein if the service guide is received via the broadcast channel, the mobile terminal previously obtained information about accessing the broadcast channel.

6. The method of claim 1, wherein if the service guide is received via an interaction channel, the mobile terminal previously obtained a URL address of other information about accessing the interaction channel.

7. An Open Mobile Alliance (OMA) device management method performed by a mobile terminal cooperating with plural servers including a broadcast server for broadcasting a service guide and a provisioning server for broadcasting a device management (DM) message, the method comprising:
  receiving the service guide that is broadcast from the broadcast server via a broadcast channel, the service guide including information related to a broadcasting service, session description information, and connectivity information, the service guide including information related to a broadcasting service, session description information, connectivity information, and a target group ID (identity);
  receiving, from the provisioning server that is broadcasting messages for device management (DM), a broadcasted DM session notification;
  establishing a broadcasting DM session with the provisioning server using the session description information and the connectivity information included in the service guide received from the broadcast server;
  receiving a DM message that is broadcast from the provisioning server;
  performing a DM provisioning procedure, including group ID (identity) checking; and
  terminating the broadcasting DM session with the provisioning server, wherein the DM message includes a group ID for a plurality of terminals belonging to a specific group, the group ID used for controlling the plurality of terminals via the DM message that was broadcast from the provisioning server, wherein the group ID checking includes a DM message reliability verification procedure including comparing the target group ID included in the service guide with the group ID included in the received DM message, such that the mobile terminal selectively processes the DM message intended for said mobile terminal among a plurality of DM messages broadcast from the provisioning server, and wherein the service guide further includes at least one of certificate information and an OCSP (Online Certificate Status Protocol) response, and wherein the DM message reliability verification procedure includes comparing a digest value obtained from decrypting an electronic signature which is extracted from the certificate information included in the service guide with a digest value obtained from decrypting the electronic signature received together with the DM message if the target group ID included in the service guide is matched with the group ID included in the received DM message.

8. The method of claim 7, wherein the step of receiving a service guide comprises: receiving the service guide using the broadcast channel or receiving the service guide according to a subscriber request using an interaction channel.

9. The method of claim 7, wherein the target group ID is identified according to an area to which a device management client belongs or a service method adopted by the device management client.

10. The method of claim 7, wherein the service guide contains digital content having an extended markup language (XML) format that can be automatically parsed or interpreted by the mobile terminal, and the service guide is received by a browser function implemented in the mobile terminal.

11. The method of claim 7, wherein if the service guide is received via the broadcast channel, the mobile terminal previously obtained information about accessing the broadcast channel.

12. The method of claim 7, wherein if the service guide is received via an interaction channel, the mobile terminal previously obtained a URL address of other information about accessing the interaction channel.

13. An Open Mobile Alliance (OMA) device management method performed by a mobile terminal cooperating with plural servers including a bootstrap server, a device management (DM) server and a terminal provisioning server, the method comprising:

receiving, from the bootstrap server, information about the DM server;

cooperating with the DM server to obtain a service guide that includes information related to a broadcasting service, session description information, connectivity information, and a target group ID (identity);

receiving, from the terminal provisioning server that is broadcasting messages for DM, a terminal provisioning session notification;

establishing a terminal provisioning session connection with the terminal provisioning server;

receiving a DM message from the terminal provisioning server;

performing a DM provisioning procedure that includes group ID (identity) checking; and terminating the terminal provisioning session with the terminal provisioning server, wherein the DM message includes a group ID for a plurality of terminals belonging to a specific group, the group ID used for controlling the plurality of terminals via the DM message that was broadcast from the terminal provisioning server, wherein the group ID checking involves a DM message reliability verification procedure including comparing the target group ID included in the service guide with the group ID included in the received DM message, such that the mobile terminal selectively processes the DM message intended for said mobile terminal among a plurality of DM messages broadcast from the terminal provisioning server, and wherein the service guide further includes at least one of certificate information and an OCSP (Online Certificate Status Protocol) response, and wherein the DM message reliability verification procedure further includes comparing a digest value obtained from decrypting an electronic signature which is extracted from the certificate information included in the service guide with a digest value obtained from decrypting the electronic signature received together with the DM message if the target group ID included in the service guide is matched with the group ID included in the received DM message.

14. The method of claim 13, wherein the step of cooperating comprises: receiving the service guide using a broadcast channel or receiving the service guide according to a subscriber request using an interaction channel.

15. The method of claim 13, wherein the target group ID is identified according to an area to which a device management client belongs or a service method adopted by the device management client.

16. The method of claim 13, wherein the service guide contains digital content having an extended markup language (XML) format that can be automatically parsed or interpreted by the mobile terminal, and the service guide is received by a browser function implemented in the mobile terminal.

17. The method of claim 13, wherein if the service guide is received via a broadcast channel, the mobile terminal previously obtained information about accessing the broadcast channel.

18. The method of claim 13, wherein if the service guide is received via an interaction channel, the mobile terminal previously obtained a URL address of other information about accessing the interaction channel.

* * * * *